United States Patent
Accardo

(10) Patent No.: US 11,337,576 B2
(45) Date of Patent: May 24, 2022

(54) PASSIVE ANTIMICROBIAL SPONGE

(71) Applicant: Thomas Accardo, Winchester, MA (US)

(72) Inventor: Thomas Accardo, Winchester, MA (US)

(*) Notice: Subject to any disclaimer, the term of this patent is extended or adjusted under 35 U.S.C. 154(b) by 7 days.

(21) Appl. No.: 17/109,748

(22) Filed: Dec. 2, 2020

(65) Prior Publication Data
US 2021/0169298 A1 Jun. 10, 2021

Related U.S. Application Data

(60) Provisional application No. 62/943,476, filed on Dec. 4, 2019.

(51) Int. Cl.
| | | |
|---|---|---|
| *A47L 13/16* | (2006.01) |
| *B32B 27/06* | (2006.01) |
| *B32B 27/18* | (2006.01) |
| *B32B 25/04* | (2006.01) |
| *B32B 25/16* | (2006.01) |
| *B32B 3/30* | (2006.01) |

(52) U.S. Cl.
CPC ............. *A47L 13/16* (2013.01); *B32B 3/30* (2013.01); *B32B 25/045* (2013.01); *B32B 25/16* (2013.01); *B32B 27/065* (2013.01); *B32B 27/18* (2013.01); *B32B 2432/00* (2013.01)

(58) Field of Classification Search
CPC ......... A47L 13/16; B32B 3/30; B32B 25/045; B32B 25/16; B32B 27/065; B32B 27/18; B32B 2432/00
See application file for complete search history.

(56) References Cited

U.S. PATENT DOCUMENTS

| 5,994,450 A | 11/1999 | Pearce |
| 6,026,527 A | 2/2000 | Pearce |
| 6,187,837 B1 | 2/2001 | Pearce |

(Continued)

FOREIGN PATENT DOCUMENTS

JP 2005312494 A * 11/2005

OTHER PUBLICATIONS

Translation of JP 2005 312494, Chiyoko Sumii, Nov. 10, 2005. (Year: 2005).*

*Primary Examiner* — Hai Vo
(74) *Attorney, Agent, or Firm* — Lambert Shortell & Connaughton; David J. Connaughton, Jr.; Justin P. Tinger

(57) ABSTRACT

A sponge used as a cleaning article that employs passive means to deter the growth of microorganisms within the sponge and reduces the possibility of cross-contamination. The sponge is capable of being placed or stowed on a surface in a vertical orientation such that its outer surfaces will be maximally exposed to air, thereby increasing the rate at which moisture can evaporate from the sponge, and therefore, making it less susceptible and more inhospitable to microbial growth. To achieve a practical and reliable degree of stability, a sticky elastomeric gel is incorporated onto the sponge's bottom surface, possessing sufficient adhesive strength to securely maintain the sponge in an upright position, yet permitting the sponge to be easily removed from the surface, while at the same time providing a prophylactic barrier between the sponge and the surface, further reducing the possibility of cross-contamination.

11 Claims, 9 Drawing Sheets

(56) References Cited

U.S. PATENT DOCUMENTS

| | | |
|---|---|---|
| 6,413,458 B1 | 7/2002 | Pearce |
| 6,498,198 B2 | 12/2002 | Pearce |
| 6,797,765 B2 | 9/2004 | Pearce |
| 6,865,759 B2 | 3/2005 | Pearce |
| 6,908,662 B2 | 6/2005 | Pearce |
| 7,060,213 B2 | 6/2006 | Pearce |
| 7,076,822 B2 | 7/2006 | Pearce |
| 10,743,736 B1 * | 8/2020 | Miller .................... A47L 13/16 |

* cited by examiner

GENERATION TIMES FOR SOME COMMON BACTERIA
For 10°C < TEMP < 40°C

| Bacterium | Medium | Generation Time $t_d$ (minutes) |
|---|---|---|
| Escherichia coli | Glucose-salts | 17   (84 min @ 20°C) |
| Bacillus megaterium | Sucrose-salts | 25 |
| Clostridium botulinum | | 80 |
| Campylobactor jejuni | | 90 |
| Listeria monocytogenes | BHI broth | 50 |
| Salmonella typhimurium | | 30   (96 min @ 20°C) |
| Streptococcus lactis | Milk | 26 |
| Streptococcus lactis | Lactose broth | 48 |
| Staphylococcus aureus | Heart infusion broth | 27-30 |
| Lactobacillus acidophilus | Milk | 66-87 |
| Rhizobium japonicum | Mannitol-salts-yeast extract | 344-461 |

*Fig. 11*

PASSIVE ANTIMICROBIAL SPONGE

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Field of the Invention

The present system and method pertains to cleaning articles and in particular to antimicrobial sponges and a method to make a sponge which is less susceptible to contamination by microorganisms and which reduces the possibility of cross-contamination.

Description of the Related Art

Cellulous and other foam sponge products are in widespread use as cleaning articles in domestic and commercial settings. However, many studies and news stories continue to report findings that cleaning sponges are among the most densely colonized bacterial habitats in the built environment. Common cleaning sponges can act as reservoirs for a highly diverse array of microorganisms, many species of which are pathogenic and pose immediate health risks. In this regard, sponges can become vectors or fomites for the transmission of infectious diseases. Of particular relevance to the present invention are food-borne pathogens such as *Campylobacter, Salmonella, Staphylococcus* and *E. coli* which are frequently encountered on or near food preparation surfaces.

While many manufacturers of cleaning articles have addressed this problem, they have relied almost exclusively on the use of chemical antimicrobial agents such a binguanides, hexachlorophene, benzethonium chloride and chloroxylenol (PCMX) to provide the active antimicrobial action and have failed to adequately incorporate non-chemical or passive means of mitigating microbial growth in these products and in particular sponges. Furthermore, chemical agents incorporated into cleaning articles can lose their effectiveness, via washout, when they are used in conjunction with cleaning chemicals such as bleach or soaps. Also of concern is the eventual release of these chemicals, via waste water, into the environment and their potentially adverse impact. More concerning still is that some antimicrobial agents, such as Triclosan™, have been implicated in the emergence of antibiotic resistant bacterial pathogens or so-called "super bugs" such as MRSA. In a broader sense, society's movement away from the current state of overreliance on antimicrobial agents including antibiotic and anti-viral medicines represents a paradigm shift in the field of epidemiology. Along with the implementation of antibiotic stewardship programs and the more prudent use of chemical antimicrobial agents, better home and industrial hygiene practices must be sought to avert the crisis of antimicrobial resistance and spread of antibiotic associated infections.

To better understand the microbiome of sponges used as cleaning articles, the loss of moisture via evaporation in open air was examined as a function of the sponge's orientation when placed or stowed on a hard, non-absorbent substrate and allowed to air dry.

As shown in FIG. 10, when a wet or moist sponge is placed on a surface in a "horizontal" orientation, such that one of its major faces is in direct contact with the surface, the time required for it to dry is longer than that for a sponge placed on a surface in a "vertical" orientation, such that both of its major faces are directly exposed to open air.

For example, a common cellulous sponge with dimensions of 4¾"×3"×⅝" and a dry weight of 6 grams that has been saturated with water and then rung out, has a weigh of 35 grams. Here, it is understood that, in practice, a sponge's resultant water content is highly variable, and that its initial wet weight is the primary determinant of the time required for it to dry out. It is also understood that differences in environmental conditions will result in different drying times.

If left to dry in still, open air, maintained at 65° F. and ~48% RH in a "vertical" orientation, the sponge will dry out in approximately 1100 minutes ($T_v$). Whereas, an identically prepared sponge placed in a "horizontal" orientation will dry out in approximately 1600 minutes ($T_h$), a difference ($\Delta T_{hv}$) given by, $$(\Delta T_{hv})=(T_h)-(T_v)$$

of approximately 500 minutes.

Referring to FIG. 11, it will be seen that the "generation time" ($t_d$) of some common mesophilic bacteria are well encompassed within the time required for a common sponge to air-dry, stowed in either orientation. Therefore, the additional time ($\Delta T_{hv}$) required for a sponge to dry when stowed in a horizontal orientation will result in $$\Delta T_{hv}/t_d^*$$

additional generations of bacterial growth.

Treating a wet sponge as a simple batch culture, the number of additional cells appearing in time ($\Delta T_{hv}$) can be approximated by the Monod model for growth kinetics.

$$\partial N/\partial T = \mu max\ S\ N/K_S+S$$

$$\partial S/\partial T = -\mu max/Y_{NS} S\ N/Ks+S$$

Where N is the concentration of cells in mg/l, S is the substrate concentration in mg/l, µmax is the maximum growth rate, $Y_{NS}$ is the yield coefficient and $K_S$ is the half-velocity constant.

FIG. 12 represents a typical Monod growth curve for a batch culture, where the parameters were chosen to illustrate how the present invention exploits the intrinsic characteristics of the microbial growth curve.

Referring to the figure, it will be seen that the exponential or log phase begins around 20 hours. This time coincides approximately with the time required for a vertically oriented sponge to dry as shown in FIG. 10, and consequently, it will have experienced relatively little bacterial growth. Referring again to FIG. 12, it will be seen that the period of time encompassing the exponential growth phase coincides with the additional time ($\Delta T_{hv}$) for the horizontally oriented sponge to dry. Therefore, most of the cell growth in the horizontally oriented sponge is occurring within the additional time ($\Delta T_{hv}$) required for it to dry. In the above example, this amounts to a 3 log increase in bacterial concentration.

It is important to reiterate that the preceding investigation compared sponges which were in an initial, rung-out state. Observed values of ($\Delta T_{hv}$) are much larger when comparing sponges that have been rung-out to sponges that have not been rung-out, i.e., saturated, and therefore, will give rise to vastly higher levels of bacterial contamination.

In the foregoing study, it is understood that only those bacteria that are spatially located within the sponge where the Water Activity ($a_w$) remains at levels supportive of microbial growth will propagate, and that other growth-limiting or grow-promoting factors unique to sponges may exist which have not been taken into consideration. It is also understood that there are many species of bacteria whose lag phase is sufficiently short to allow them to enter their log phase during the time required for a rung-out and vertically stowed sponge to dry; however, it is always desirable that a sponge's moisture content, after use, progress as rapidly as possible to a sub-optimal level for microbial growth.

The simple expedient of allowing a sponge to dry out while maintained in a vertical orientation can reduce the growth of unwanted bacteria by (n) log amounts. Unfortunately, while the forgoing discussion clearly argues for the efficacy of adopting the hygiene practice of stowing cleaning sponges in a vertical orientation, the limitations of existing sponges do not facilitate this practice. In fact, during the routine use of cleaning sponges, they will often remain in a perpetual state of dampness or wetness, receiving regular replenishment of water and nutrients. This practice results in bacterial growth cycles that can span weeks and bacterial loads exceeding $10^9$ CFU/cm$^3$. A sponge used in this manner can support microbial life indefinitely and can be characterized as a continuous culture or open system.

The present invention also addresses an inherent shortcoming in kitchen sink organizers or makeshift receptacles employed for stowing various cleaning implements, such as, soap dispensers, scrub brushes, scouring pads and in particular sponges. In the course of using these products, it is common for the drippings and runoff from sponges to accumulate within these receptacles. When cross-contamination occurs via this route, these receptacles can also become host to high levels of bacteria and become fomites as well.

In view of the forgoing, it would be useful for a sponge to possess features which reduce the concentration of potentially harmful microorganisms arising in the sponge without the use of chemical antimicrobial agents and which allow it to be stowed, after use, in a way that reduces the risk of cross-contamination of surfaces or objects it might otherwise come in contact with. Such a cleaning article would be of value to hospitals, schools, daycare centers, restaurants, food handlers, commercial bakers, the hospitality industry, cruise lines and private households to name but a few.

SUMMARY OF THE INVENTION

The instant system and method, as illustrated herein, are clearly not anticipated, rendered obvious, or even present in any of the prior art mechanisms, either alone or in any combination thereof. Thus the several embodiments of the instant apparatus are illustrated herein.

In one embodiment, the instant system contemplates a novel apparatus for cleaning.

In a further objective of the instant system is to disclose a novel apparatus for cleaning with a passive means to significantly reduce the microbial growth rate.

Another objective of the instant system is to disclose a novel apparatus for cleaning that reduces the possibility of cross contamination of surfaces and other objects.

Yet another objective of the instant system is to disclose a novel apparatus for cleaning that has a preferred trapezoidal shape allowing the apparatus to stand in an upright vertical position. The upright vertical position exposes the major faces of the sponge to air which further allows the apparatus to dry at an increased rate, reducing the time the apparatus is moist and susceptible to microbial growth.

The instant system further discloses a novel apparatus for cleaning with a trapezoidal shape capable of standing that is accomplished by a tacky, soft elastomer gel that is permanently adhered to the base of the cleaning apparatus. The adhesive is preferably strong enough to keep the cleaning apparatus in an upright position, forming a temporary bond to the surface the sponge is placed on and yet simultaneously capable of easy removal from the storage location.

A further object of the instant system is to provide a sponge with an elastomeric base wherein the base is flexible, soft and durable enough to withstand repeated ringing out and rinsing cycles of the sponge throughout its service life.

Another objective of the instant system is to disclose a novel apparatus for cleaning, and further utilize a portion which includes a tacky, soft elastomer gel that serves as a prophylactic barrier between the sponge and a surface and thus further reduces the risk of cross-contamination of household surfaces.

The instant system further discloses a novel apparatus for cleaning with a trapezoidal shape that is capable of standing up which is further accomplished by a base surface that is wider than the top surface, resulting in a trapezoidal cross section.

It is another object of the present system to provide a sponge that can be stowed in a vertical orientation on an inclined surface.

Another object of the instant system is to provide a sponge with a polymeric material adhered to its bottom surface that permits airflow under the sponge to speed up drying.

Another object of the instant system is to provide a sponge that can be conveniently stowed away from contact with other objects.

It is an objective of the instant system to disclose a novel apparatus for cleaning that can be stored vertically on a surface.

It is also an objective of the instant system to disclose a novel apparatus for cleaning that is easy to use.

It is a further objective of the instant system to disclose a novel apparatus for cleaning that is inexpensive.

It is yet a further objective of the instant system to disclose a novel apparatus for cleaning that is environmentally friendly, chemical free, healthier, safer and more sanitary.

It is also an objective of the instant system to disclose a novel apparatus for cleaning that is efficient.

Another objective of the instant system is to disclose a novel apparatus for cleaning that is wholly portable.

There has thus been outlined, rather broadly, the more important features of the antimicrobial sponge apparatus in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

Advantages of the present system will be apparent from the following detailed description of exemplary embodiments thereof, which description should be considered in conjunction with the accompanying drawings, in which: Having thus described the system in general terms, reference will now be made to the accompanying drawings, which are not necessarily drawn to scale, and wherein:

FIG. 11 illustrates a chart communicating the time it takes for specific bacteria to complete a growth cycle.

DETAILED DESCRIPTION OF THE SEVERAL EMBODIMENTS

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1:
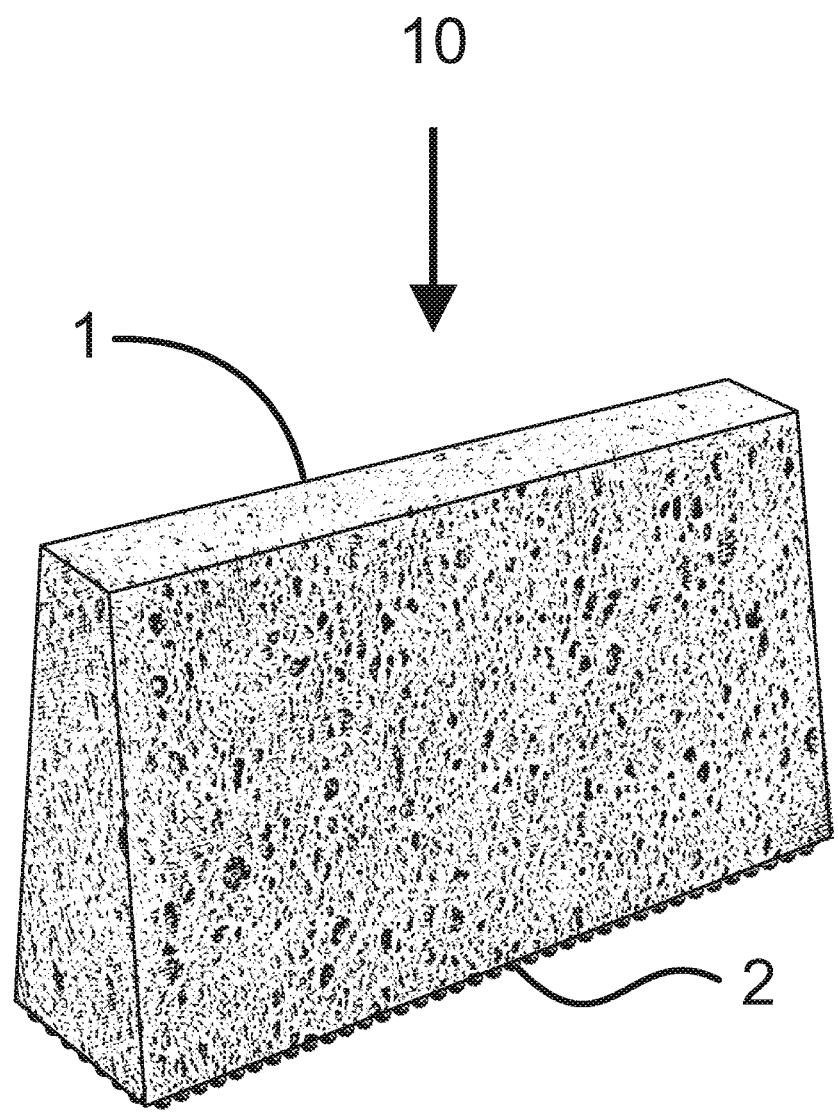
FIG. 1 illustrates a top perspective view of the passive antimicrobial sponge, the preferred embodiment of the invention.

FIG. 1 illustrates a top perspective view of the passive antimicrobial sponge 10, the preferred embodiment of the invention, comprising a sponge body 1 and an elastomer base 2 comprising a tacky gel. In one embodiment, the sponge body 1 is made from a cellulous or expanded polymeric foam suitable for cleaning applications. The processes and techniques used to make these materials and their manufacture into products are well represented in the prior art.

The shape of the passive antimicrobial sponge 10 permits it to be placed or stowed on a surface in a stable, upright orientation. By virtue of its lower center of gravity and wider base, it is an inherently more stable shape than a comparably sized rectangular-cuboid shaped sponge, placed likewise on a surface. The passive antimicrobial sponge 10 comprises a six-sided polyhedron bounded by two opposing, inwardly sloping, congruent rectangular sides 3, 4 two opposing, parallel and congruent isosceles trapezoid shaped sides 5, 6 and two opposing, parallel and incongruent rectangular sides 7, 8.

In one embodiment, the sponge body 1 comprises a rectangular top surface 7 and rectangular bottom surface 8 with a 1:1 top surface 7 to bottom surface 8 length 12 ratio and a 2:3 top surface 7 to bottom surface 8 width 14 ratio, wherein the top surface 7 and bottom surface 8 are separated by a length equivalent to ⅗ the top surface 7 length 12. In another embodiment, the top surface 7 and bottom surface 8 are separated by a length equivalent to ⅔ the top surface 7 length 12. These embodiments are not exhaustive of the variety of ratios possible.

Figure 2:
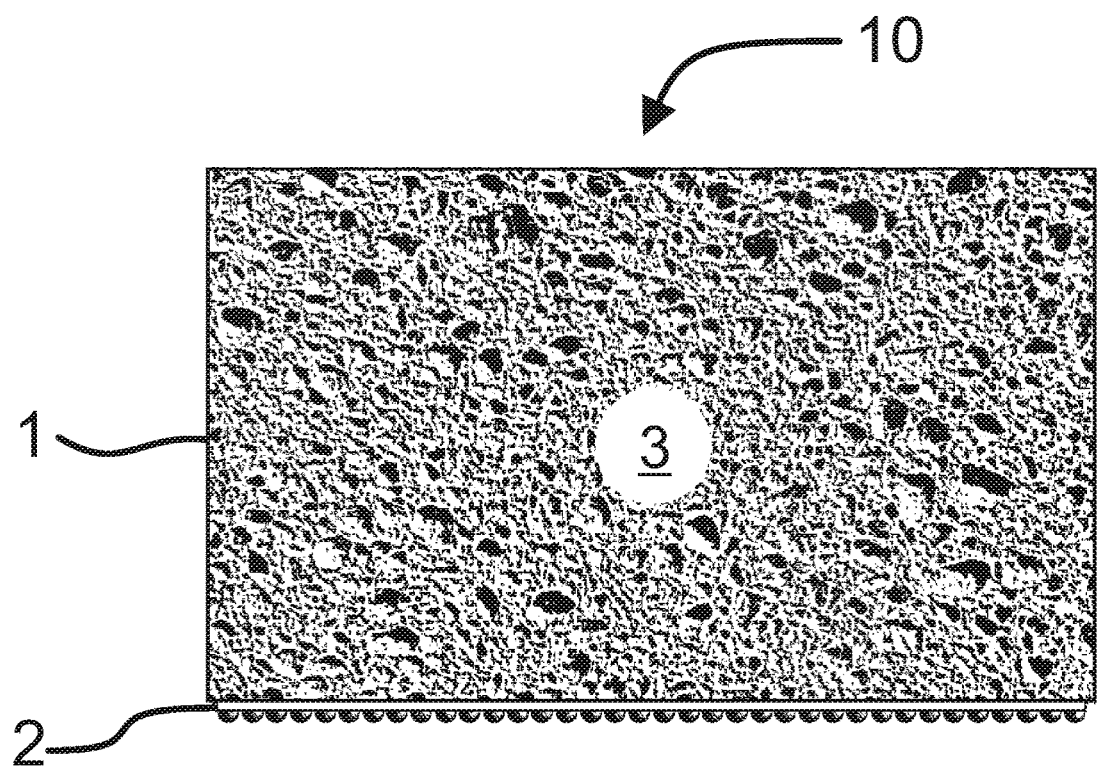
FIG. 2 illustrates a front view of the passive antimicrobial sponge.
Figure 3:
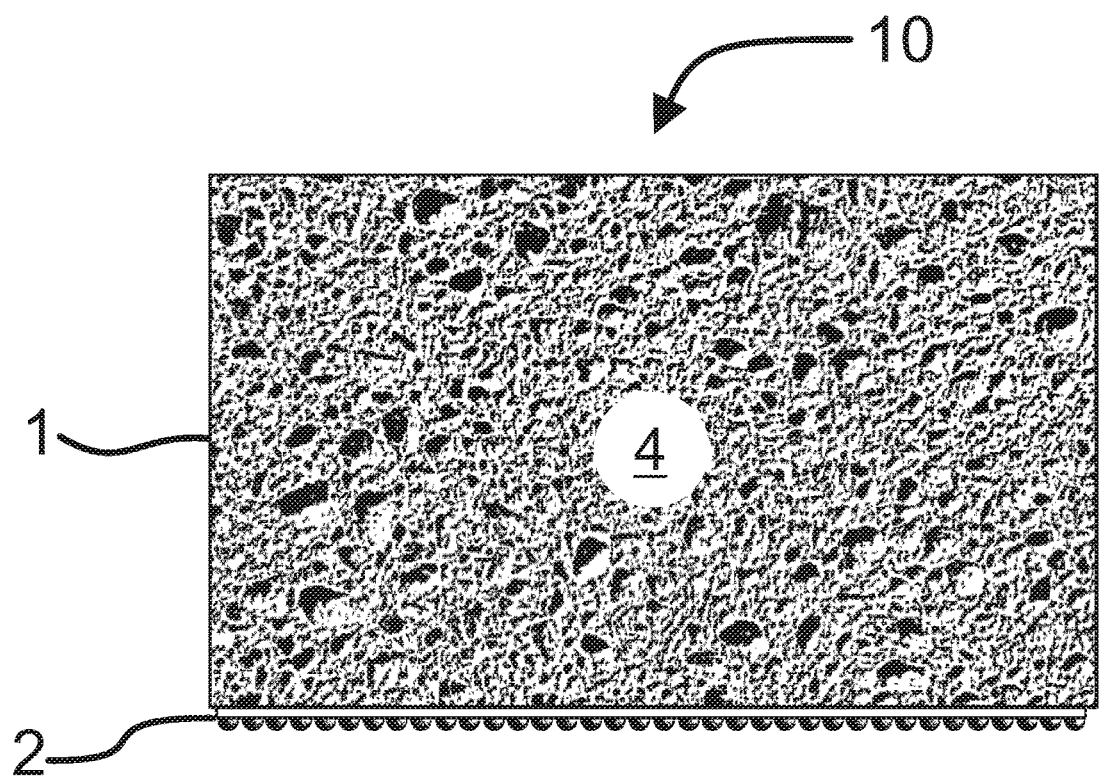
FIG. 3 illustrates a back view of the passive antimicrobial sponge.

FIGS. 2 and 3 illustrate a front view and a back view of the passive antimicrobial sponge 10 respectively. The shape of the passive antimicrobial sponge 10 can be described as a six sided polyhedron bounded by two opposing, inwardly sloping, congruent rectangular sides 3, 4. In more succinct terms, in one embodiment, the shape of the passive antimicrobial sponge 10 can be characterized as a truncated right prism.

Figure 4:
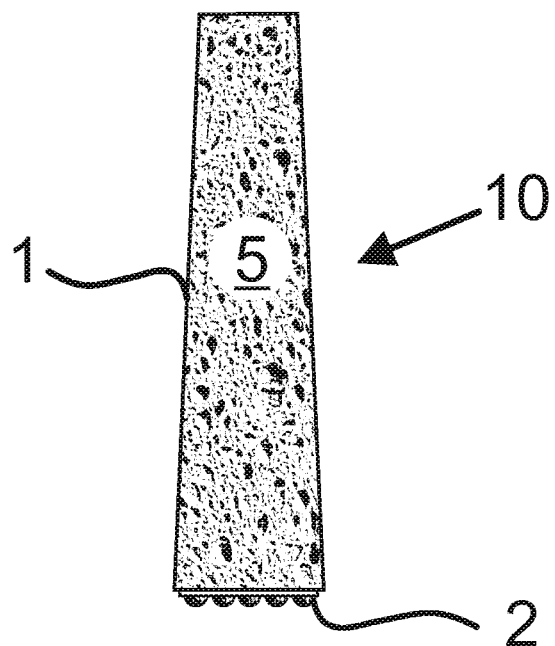
FIG. 4 illustrates the left side view of the passive antimicrobial sponge.
Figure 5:
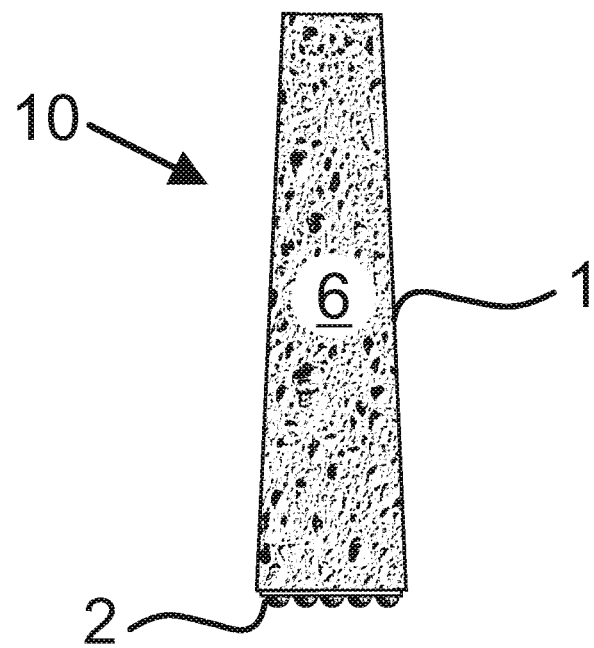
FIG. 5 illustrates the right side view of the passive antimicrobial sponge.

FIGS. 4 and 5 illustrate the left side view and right side view of the passive antimicrobial sponge respectively. In an additional embodiment, the shape of the passive antimicrobial sponge 10 can further be described as a six sided polyhedron bounded by two opposing, parallel and congruent isosceles trapezoid shaped sides 5, 6.

Figure 6:
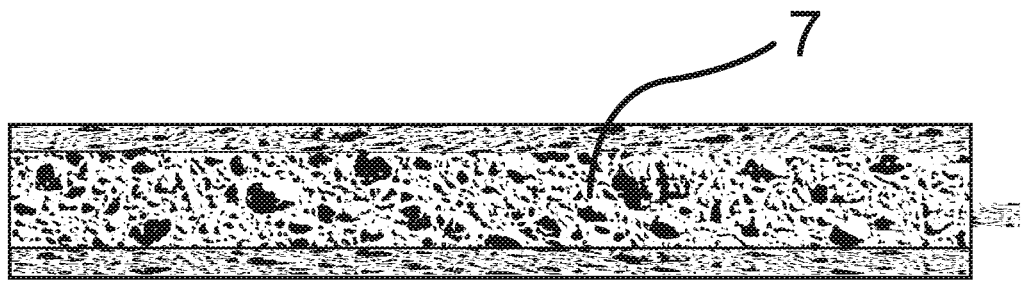
FIG. 6 illustrates the top plan view of the passive antimicrobial sponge.
Figure 7:
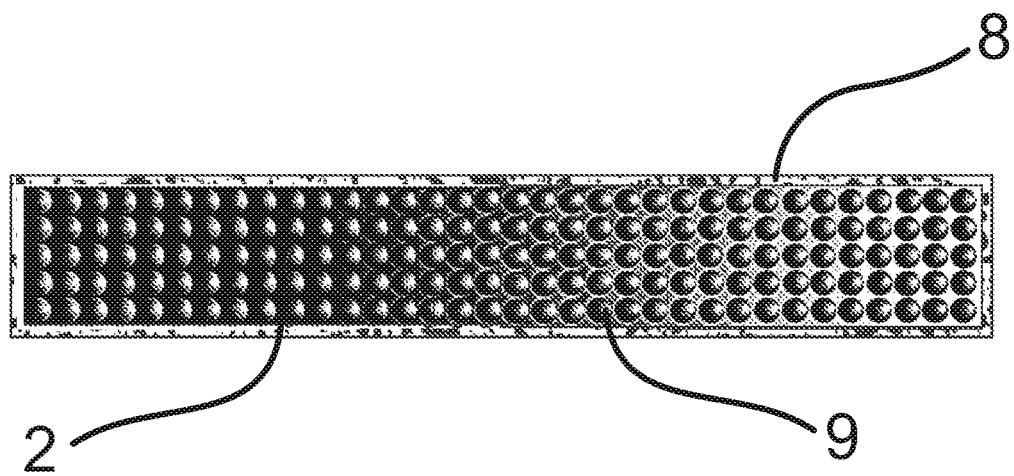
FIG. 7 illustrates the bottom plan view of the passive antimicrobial sponge.

FIGS. 6 and 7 illustrate the top plan view and bottom plan view of the passive antimicrobial sponge respectively. In an additional embodiment, the shape of the passive antimicrobial sponge 10 can further be described as a six sided polyhedron bounded by two opposing, parallel and incongruent rectangular sides 7, 8.

Referring to FIG. 7, the elastomer base 2 is adhered in communication with the bottom surface 8 of the sponge body 1 and comprises one of many well-known elastomers and is further formed of a soft, gelatinous elastomer such as, but not limited to, urethanes (including polyester and polyether polyol/isocyanate polymerization products), polyacrylates, polybutadienes, ethylene propylene elastomers, silicones, natural and synthetic rubbers, styrene/butadiene block copolymers, and the like. In some embodiments, the polymer gel can be formed of a thermoplastic elastomer. The thermoplastic elastomer can be block copolymers such as polyurethanes, polyamides, copolyesters, and styrene-butadiene-styrene polymers. Other thermoplastic elastomers can be elastomer/thermoplastic blends such as ethylene-propylene-diene monomer in an isotactic polypropylene phase or nitrile rubber dispersed in a PVC phase.

Figure 8:
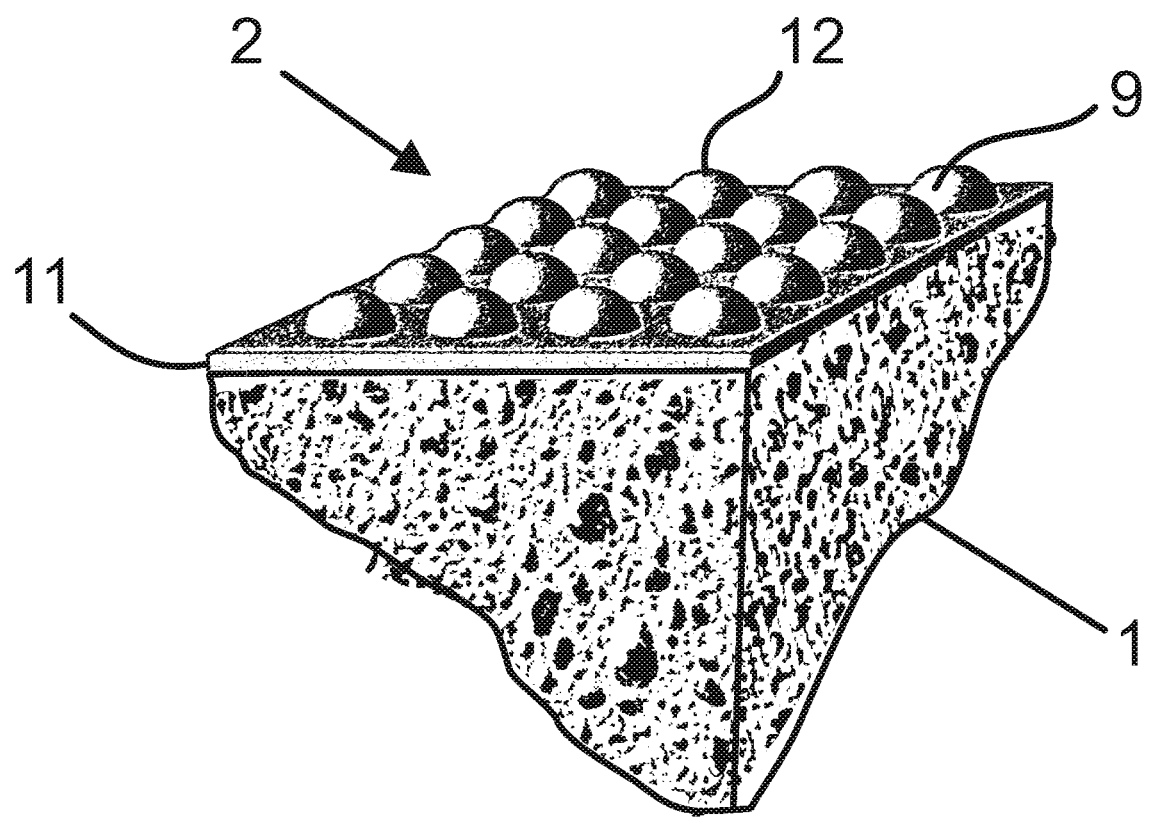
FIG. 8 illustrates an enlarged perspective view of the sticky elastomer base.

FIG. 8 further illustrates the elastomer base 2 comprising a plurality of small bump-like projections 9 being integrally formed with the sticky elastomer foundation 11. When the passive antimicrobial sponge 10 is placed on a surface these projections 9 make contact with and form a temporary non-chemical bond with said surface, thereby attaching the passive antimicrobial sponge 10 to the surface with sufficient gripping strength to reliably maintain the sponge in an upright position while it dries, yet allowing the user to easily remove the passive antimicrobial sponge 10 from the surface when needed.

In one embodiment, the elastomer base 2 is formed on the bottom surface 8 of the sponge as a polyurethane based elastomeric coating applied in a liquid state, which subsequently undergoes a curing process which permanently bonds it, through primarily mechanical means, to the passive antimicrobial sponge 10.

In yet another embodiment, the elastomer base 2 can be cast or molded as a separate component and then adhered to the sponge body 1 as a lamination using a suitable adhesive. In some instances, depending on the choice of materials, it may be necessary to use an intermediate bonding surface between the sponge 1 and the elastomer base 2. The use of an intermediate bonding surface can affect a stronger bond with both the elastomer base 2 and sponge 1 than a direct bond between the elastomer base 2 and the sponge 1.

As used herein, "thermoplastic elastomer" refers to an elastomer which is composed of crystalline and amorphous domains and can be heated and processed like thermoplastic materials. Specifically, a thermoplastic elastomer can be heated to a melted or flowable state and then cooled, resulting in reformation of cross-linking and subsequent coherency without a substantial change in mechanical properties such as strength, flexural modulus, elastic modulus, etc. Additionally, "elastomeric polymer" and "elastomer" may be used interchangeably and refer to a polymeric material which can be mechanically deformed and upon release returns to an original shape. A coherent elastomer is non-flowable at or near room temperatures. Also as used herein, "sticky" or "tacky" refer to a property of some polymeric materials which imparts adhesion to most surfaces without a loss of coherency in the polymer. Adhesion can occur via mechanical adhesion or specific adhesion also known as non-chemical adhesion. Specific adhesion, refers to adhesion dominated, or entirely characterized, by secondary intermolecular forces, i.e. non-covalent bonds, although some covalent bonds can be formed depending on the surface energies of the mating surfaces.

In one embodiment of the present invention, the elastomer base 2 described herein may be made in whole or in part from an elastomeric gel or other desired material. The gel comprises a solid elastomer extended by at least 20 parts plasticizer per 100 parts solid elastomer by weight. In some instances, the solid elastomer is extended to at least 50:100 and most preferably by at least 100:100. Some acceptable gels are disclosed in U.S. Pat. Nos. 7,060,213; 7,076,822; 6,908,662; 6,865,759; 6,797,765; 6,498,198; 6,413,458; 6,187,837; 6,026,527; 5,994,450, each of which is hereby incorporated by reference in its entirety.

In the present embodiment, the composition of the elastomeric gel is most preferably a styrenic thermoplastic elastomer, such as a styrene-butadiene-styrene block copolymer (SBS) or a styrene-ethylene-butadiene-styrene block copolymer (SEBS). This thermoplastic material is impregnated with a hydrogenated naphthenic oil to impart its permanent tackiness and softness. The preferred material is further described below, but a myriad of similar materials may be substituted, so long as they provide equivalent functional performance.

The elastomeric gel may be comprised of one-hundred parts (SEBS) by weight, one-hundred to three-hundred parts hydrogenated naphthenic oil by weight, one-hundred to three-hundred parts white (mineral) oil by weight, less than ten parts petroleum tackifier resin by weight, and one to five parts PP resin by weight. Such (SEBS) may be SEPTON™ 4055 or 4044. Septon™ is a series of styrenic-based thermoplastic rubbers. It is a block copolymer that consists of styrene-based hard blocks and a diene soft block. They are hydrogenated di-block and tri-block styrene copolymers that exhibit rubber like properties. Septon™ is recyclable and non-toxic.

Comparing the influence of mineral extender oils on the viscosity and some basic physical properties of a 3-block styrene-butadiene-styrene (SBS) copolymer, a naphthenic oil has a higher compatibility with the thermoplastic elastomer as compared with a paraffinic. The mechanical and low temperature properties are improved and are even more underlined as the difference in the viscosity is so large. Low viscosity normally improves both the solvency power and the pour point.

The hydrogenated naphthenic oil preferably constitutes one-hundred-fifty to three hundred parts of the elastomeric gel by weight, more preferably two-hundred to two-hundred-eighty parts by weight. This oil may comprise PetroChina Company's K series, or some equivalent.

The white (mineral) oil preferably constitutes one-hundred-fifty to three hundred (150-300) parts of the adhesive layer by weight, more preferably two-hundred to two-hundred-eighty parts by weight.

The petroleum tackifier resin may be for example, C9 petroleum resin, C5 petroleum resin, C5/C9 copolymerized petroleum resin. The tackifier resin preferably constitutes less than ten parts of the elastomer base 2 by weight, more preferably three to eight parts.

The PP resin may be improved by the addition of additives, including but not limited to plasticizers (such as paraffin or PE oligomers), antioxidants (such as calcium carbonate or silica), light stabilizers and UV stabilizers (such as UV-P and UV-320). These additives preferably constitute four to eight parts of the elastomer base 2 by weight.

In the present embodiment, the elastomer base 2 serves multiple functions. It supplements the intrinsic stability of the sponge's 1 shape by creating a temporary adhesive bond between the sponge body 1 and the surface it is placed on, thereby ensuring the sponge body 1 remains in an vertical position while it dries, yet permitting the passive antimicrobial sponge 10 to be easily removed from the surface when it is needed. It provides a prophylactic barrier between the sponge body 1 and the surface on which it has been placed, thereby reducing the possibility of cross-contamination with the surface. And, it permits airflow under the bottom surface 8 of the sponge body 1, further reducing the time required for the passive antimicrobial sponge 10 to dry.

Another important property of the elastomer base 2 is that it is soft and flexible enough to not interfere with routine ringing out and rinsing of the passive antimicrobial sponge 10 during use. In a preferred embodiment, the elastomer base 2 will have a durometer in the range of less than 50 on the Shore 00 scale and between 20 and 800 g Bloom on the Bloom scale of gel rigidity. The specific choice of properties such as tensile strength, tear strength, gel modulus, chemical resistance, elasticity and resilience can be tailored to the intended use and composition of a particular sponge material.

For comparison purposes, a Low Bloom value is normally resides within a range between 50-125, a Medium Bloom is normally resides within a range between 175-225 and a High Bloom is normally resides within a range between 225-325.

The "stickiness or tackiness" of the elastomer base 2 is an intrinsic property of the elastomeric gel. As such, it can retain its adhesive properties over the service life of the sponge. The degree of stickiness or tackiness can be controlled through the use of plasticizers and other additives. Of particular use in these regards are rubber processing oils such as paraffinic and naphthenic petroleum oils, highly refined aromatic-free paraffinic and naphthenic food and technical grade white petroleum mineral oils, and synthetic liquid oligomers of polybutene, polypropene, and polyterpene.

Many such oils are known and commercially available. Other components may be used in the gel as well, such as, tackifiers, antioxidants, colorants, bleed reducing additives, microspheres and others. In a one embodiment, the elastomer base 2 has sufficient adhesive strength to maintain the passive antimicrobial sponge 10 in an upright position yet encompass ease of removal from a surface. Preferably, the adhesive strength of the elastomeric gel is between 0.01 and 0.6 N/cm. However, it will be understood that the "effective" adhesive strength of the elastomer base 2 will also be a function of the number and size of the contact zones 9.

In the course of using the passive antimicrobial sponge 10 for cleaning, it may, from time to time, be necessary to remove any soils which may be present on the elastomer base 2 and which might lessen the overall effectiveness the passive antimicrobial sponge 10. Restoring the effectiveness of the elastomer base 2 is easily and conveniently accomplished by rinsing the elastomer base 2 with soapy water.

Referring now to FIGS. 7 and 8, the elastomer base 2 comprises a plurality of small bump-like projections 9 being integrally formed with the elastomer base 2. When the passive antimicrobial sponge 10 is placed on a surface, the extreme-most portions of these projections become the sites of adhesion or contact zones 12 where a temporary non-chemical bond is made with the surface, thereby anchoring the passive antimicrobial sponge 10 to said surface. The size, shape and arrangement of the elastomer base 2 surface features can be adapted for various purposes and environments, i.e. wet versus dry environments.

To optimize the performance of the elastomer base 2, consideration must again be given to the presence of water. It has been found that a system utilizing numerous protruding "smaller area" contact zones 12 performs better than a system utilizing fewer, "larger area" contact zones. This is because a film of water can form between a "larger area" contact zone 12, and spread out over the entire contact zone, rendering the contact zone 12 ineffective. By distributing the adhesive function of the elastomer base 2 across a plurality of smaller contact zones 12, the adverse effect of water can be mitigated. Furthermore, larger surface area contact zones are undesirable because when a film of water is trapped between two flat surfaces it receives only peripheral exposure to open air, proportionately increasing the time required for it to evaporate and therefore increasing the time required for the adhesion site to become functional.

In both cases however, the rheological properties of elastomeric gels provide a countervailing effect to the adverse presence of water. Due to the viscoelastic nature of elastomeric gels, and in particular very low modulus elastomeric gels, when the passive antimicrobial sponge 10 is placed on a surface and the projections 9 of the elastomer base 2 physically contact the surface, the area of the contact zones 12 increases under the stress (compression) of the weight of the passive antimicrobial sponge 10 until the elastomer reaches its final state of strain. As this deformation or "creep" occurs, any water directly under the contact zone 12 is displaced, which allows the contact zone 12 to further "wet-out" on the surface, increasing the adhesive bond. Here, the term "wet-out" is used to describe the process by which an adhesive material comes into intimate contact with a substrate. This property is particularly advantageous for small contact zones as it can/will occur at a faster rate.

Figure 9:
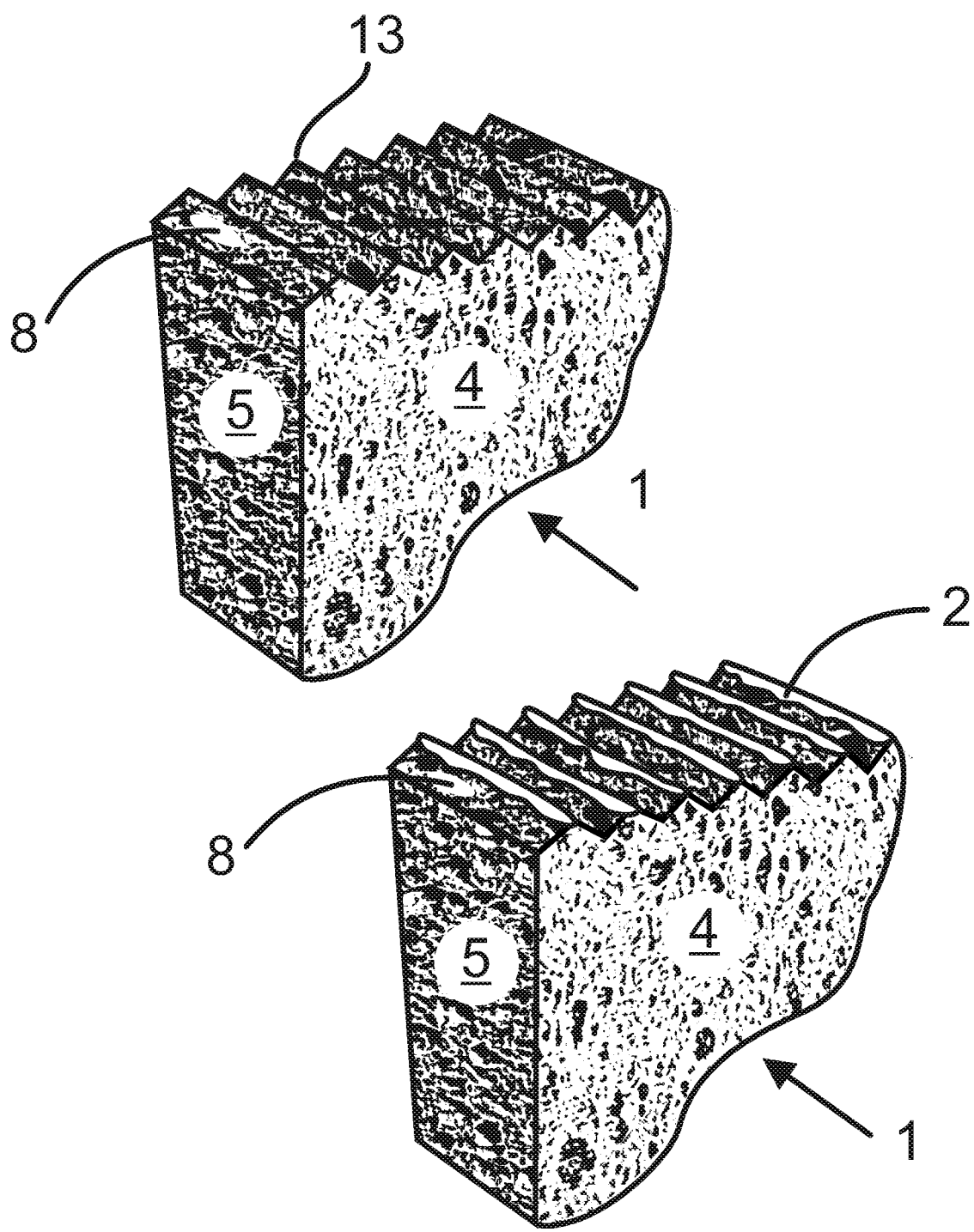
FIG. 9 illustrates an enlarged perspective view of another embodiment of the sticky elastomer base.
Figure 10:
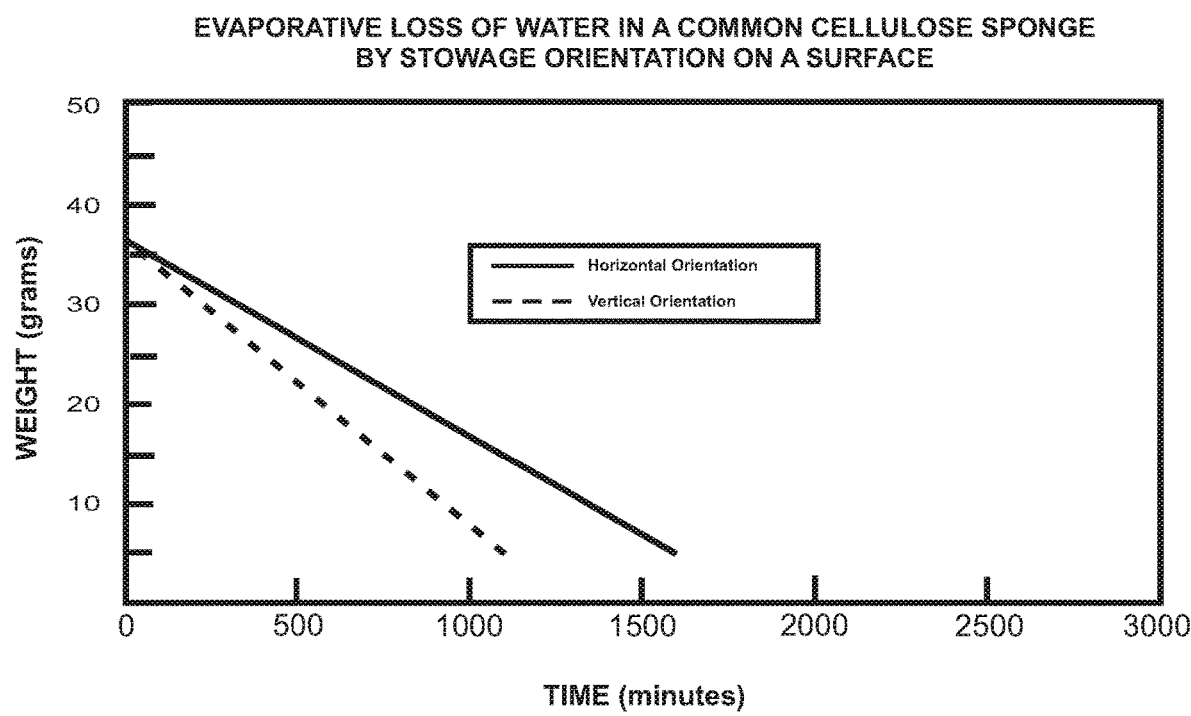
FIG. 10 illustrates a graph displaying the rate of loss of moisture in a sponge.
Figure 12:
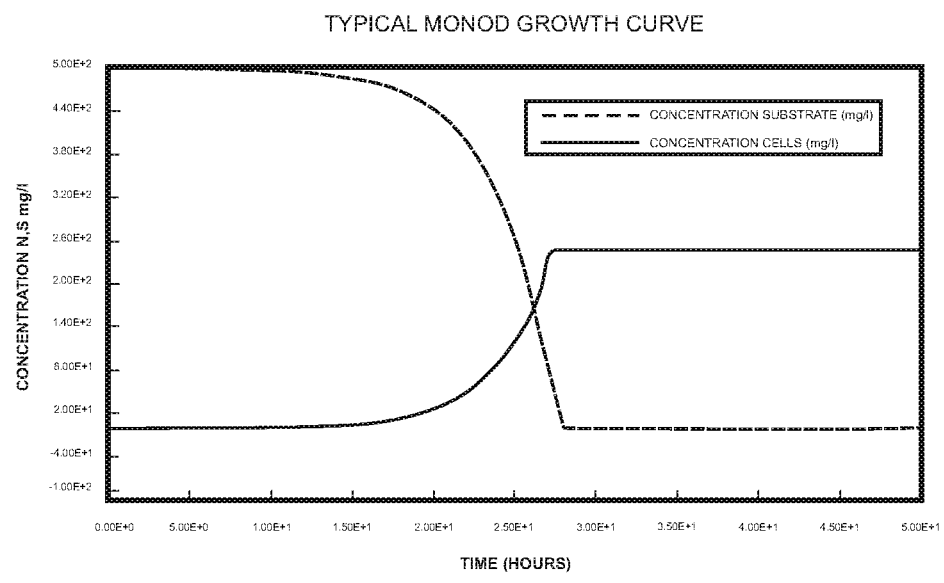
FIG. 12 illustrates a chart displaying a typical Monod growth curve.

FIG. 9 illustrates a perspective view of another embodiment of the elastomer base 2. In this embodiment, the bottom surface 8 of the antimicrobial sponge 10 forms a plurality of ridge-shaped structures 13 to which the elastomer base 2 has been adhered. For clarity, two views are illustrated. One before and one after the elastomer base has been applied. The design of this embodiment enables air flow around and under the bottom surface(s) 8 of the passive antimicrobial sponge 10, which promotes faster drying while retaining the prophylactic function of the sticky base 2. The ridge-shaped structures 13 further promote adhesion to a surface in order to provide support for the passive antimicrobial sponge 10 while placed in the standing upright position.

The ridge-shaped sticky base 2 provides similarly small-area contact zones as the small bump-like protrusions in FIGS. 7 and 8.

What is claimed is:

1. A cleaning sponge, comprising:
   a body comprising an absorbent foam having a truncated right prismatic shape;
   wherein the body comprises a cellulous expanded polymeric foam comprising a six-sided polyhedron bounded by two opposing, inwardly sloping, congruent rectangular sides, two opposing, parallel and congruent isosceles trapezoid shaped sides, and two opposing, parallel and incongruent rectangular sides;
   the body further comprising a top surface comprising a length and a width, and a bottom surface comprising a length and a width wherein the length of the top surface and the length of the bottom surface are equivalent, and the width of the top surface comprises approximately ⅔ of the width of the bottom surface;
   a tacky elastomer base layer attached to the bottom surface of the body;
   wherein the tacky elastomer base layer further comprises a plurality of bump-shaped projections integrally formed within the tacky elastomer base layer;
   wherein the tacky elastomer base layer is formed of an elastomeric gel comprising a solid elastomer extended by at least 20 parts of a plasticizer per 100 parts by weight of the solid elastomer.

2. The cleaning sponge of claim 1, wherein the tacky elastomer base layer has a Shore hardness of less than 50 g on the Shore 00 scale and a gel rigidity Bloom value between 20 g and 80 g.

3. The cleaning sponge of claim 1, wherein the elastomeric gel further comprises a styrenic thermoplastic elastomer impregnated with a hydrogenated naphthenic oil.

4. The cleaning sponge of claim 3, wherein the elastomeric gel further comprises 100 parts by weight of a styrene-ethylene-butadiene-styrene block copolymer, 100 to 300 parts by weight of a hydrogenated naphthenic oil, 100 to 300 parts by weight of white mineral oil, less than 10 parts by weight of a petroleum tackifier resin, and 1 to 5 parts by weight of a polypropylene resin, based on the total weight of the elastomeric gel.

5. The cleaning sponge of claim 4, wherein the hydrogenated naphthenic oil comprises 150 to 300 parts by weight based on the total weight of the elastomeric gel.

6. The cleaning sponge of claim 5, wherein the hydrogenated naphthenic oil comprises 200-280 parts by weight based on the total weight of the elastomeric gel.

7. The cleaning sponge of claim 4, wherein the white mineral oil comprises 150 to 300 parts by weight based on the total weight of the elastomeric gel.

8. The cleaning sponge of claim 7, wherein the petroleum tackifier resin comprises 3 to 8 parts by weight based on the total weight of the elastomeric gel.

9. The cleaning sponge of claim 4, wherein the petroleum tackifier resin further comprises one of C9 petroleum resin, C5 petroleum resin, or C5/C9 copolymerized petroleum resin.

10. The cleaning sponge of claim 4, wherein the polypropylene resin further comprises plasticizers, antioxidants, light stabilizers, ultra violet stabilizers or any combinations thereof.

11. The cleaning sponge of claim 10, wherein the plasticizers further comprise paraffin, polypropylene oligomers or a combination thereof, and
   wherein the antioxidants further comprise calcium carbonate, silica or a combination thereof.

* * * * *